United States Patent
Spottiswoode et al.

(10) Patent No.: US 8,814,096 B2
(45) Date of Patent: Aug. 26, 2014

(54) METHOD OF CONTROLLING THE CENTRE OF GRAVITY OF AN AIRCRAFT

(75) Inventors: Michael Spottiswoode, Bristol (GB); Antoine Burckhart, Bristol (GB); Petter Sjungargard, Bristol (GB)

(73) Assignee: Airbus Operations Limited, Bristol (GB)

( * ) Notice: Subject to any disclaimer, the term of this patent is extended or adjusted under 35 U.S.C. 154(b) by 357 days.

(21) Appl. No.: 13/131,209

(22) PCT Filed: Nov. 25, 2008

(86) PCT No.: PCT/GB2008/051110
§ 371 (c)(1),
(2), (4) Date: May 25, 2011

(87) PCT Pub. No.: WO2010/061156
PCT Pub. Date: Jun. 3, 2010

(65) Prior Publication Data
US 2011/0226906 A1    Sep. 22, 2011

(51) Int. Cl.
*B64C 17/10*    (2006.01)

(52) U.S. Cl.
USPC .................................................. 244/135 C

(58) Field of Classification Search
USPC ................... 244/135 C, 135 R; 137/557; 220/562–564; 73/170.02, 65.01, 65.05, 73/290 R
See application file for complete search history.

(56) References Cited

U.S. PATENT DOCUMENTS

| | | | |
|---|---|---|---|
| 2,838,928 A | | 6/1958 | Bergeson |
| 2,960,294 A | | 11/1960 | Johnston et al. |
| 4,932,609 A | * | 6/1990 | Secchiaroli et al. ...... 244/135 C |
| 5,124,933 A | * | 6/1992 | Maier ......................... 73/290 R |
| 5,321,945 A | | 6/1994 | Bell |
| 6,157,894 A | * | 12/2000 | Hess et al. ...................... 73/292 |
| 6,815,108 B2 | * | 11/2004 | Ueda et al. ..................... 429/429 |
| 6,913,228 B2 | * | 7/2005 | Lee et al. ................... 244/135 C |
| 2004/0245396 A1 | | 12/2004 | Haghayeghi |
| 2005/0051666 A1 | | 3/2005 | Lee et al. |
| 2005/0115314 A1 | * | 6/2005 | Meagher ..................... 73/290 B |

FOREIGN PATENT DOCUMENTS

RU    2140377    10/1999

OTHER PUBLICATIONS

International Search Report and the Written Opinion for PCT/GB2008/051110 mailed Oct. 29, 2009.
Russian Decision on Granting for Application No. 2011123153/11(034350) mailed Nov. 23, 2012.

* cited by examiner

*Primary Examiner* — Joseph W Sanderson
*Assistant Examiner* — Marc Burgess
(74) *Attorney, Agent, or Firm* — Lowe Hauptman & Ham, LLP

(57) ABSTRACT

A method of controlling the center of gravity of an aircraft having a plurality of fuel tanks, the method comprising transferring fuel from one or more of the fuel tanks according to a predetermined sequence, the timing of the sequence being dependent on the decrease in gross weight of the aircraft.

15 Claims, 2 Drawing Sheets

METHOD OF CONTROLLING THE CENTRE OF GRAVITY OF AN AIRCRAFT

RELATED APPLICATIONS

The present application is a National Phase of International Application Number PCT/GB2008/051110, filed Nov. 25, 2008.

FIELD OF THE INVENTION

The present invention relates to a method of controlling the gross weight centre of gravity (GWCG) of an aircraft by adopting a predetermined fuel transfer sequence dependant on the change in gross weight of the aircraft.

BACKGROUND TO THE INVENTION

In aircraft with multiple fuel tanks it is common practice to automatically transfer fuel between individual tanks during a flight as the fuel is used. Whilst the control of the fuel transfers will depend on the amount of fuel in the various tanks, other factors may also be taken into consideration. One such factor is the gross weight centre of gravity (GWCG) of the aircraft. As fuel is used the GWCG can move fore or aft along the central axis of the aircraft. If the GWCG is allowed to move beyond certain limits the ability of the pilot to control the aircraft can be impaired. The transfer of fuel between different tanks in the aircraft is used to control the movement of the GWCG and prevent the fore and aft limits being exceeded.

Some aircraft have one or more of the fuel tanks located towards the rear of the aircraft, for example within the horizontal stabilisers of the tail section or towards the rear of the cargo area. As this fuel tank is located at an extremity of the aircraft the weight of fuel held within it has a large impact on the GWCG of the aircraft as a whole.

Ordinarily the GWCG of the aircraft is calculated using the mass of fuel in each of the individual fuel tanks, the fuel mass being given by a fuel quantity indication (FQI) for each fuel tank. The transfer of fuel is controlled based on this calculated value, amongst other values, to maintain the GWCG within the fore and aft limits. However, in the event of a failure of one or more of the FQIs, and in particular the FQI for the trim tank, it is not possible to directly calculate the GWCG based on the reported mass of fuel and therefore not possible to directly control the transfer of fuel to control the GWCG on this basis.

SUMMARY OF THE INVENTION

According to an aspect of the present invention there is provided a method of controlling the centre of gravity of an aircraft having a plurality of fuel tanks, the method comprising transferring fuel from one or more of the fuel tanks according to a predetermined sequence, the timing of the sequence being dependent on the decrease in gross weight of the aircraft.

The predetermined sequence is arranged to maintain the centre of gravity of the aircraft between predetermined fore and aft limits.

The plurality of fuel tanks preferably includes a trim tank and the sequence comprises alternating between a fuel transfer from one or more of the fuel tanks other than the trim tank for the time taken for the gross weight to decrease by a first amount and a fuel transfer from the trim tank for the time taken for the gross weight to decrease by a second amount, the second amount being less than the first amount.

The gross weight of the aircraft may be calculated as the sum of a predetermined value for the weight of the aircraft with zero fuel on board and a value for the current fuel on board.

Additionally, the value for the current fuel on board may be calculated as a value for the initial amount of fuel on board (FOBinit) minus the amount of fuel used.

Additionally, the value for the initial amount of fuel on board (FOBinit) may be determined at the time when all the aircraft engines have started as the sum of fuel in each fuel tank. The amount of fuel in each fuel tank may be manually entered.

Alternatively, each fuel tank may have an associated fuel quantity indicator and the value for the initial amount of fuel on board (FOBinit) may be determined at the time when all the aircraft engines have started as the sum of an assigned value of fuel for each fuel tank having a failed associated fuel quantity indicator plus the sum of fuel in each of the remaining fuel tanks.

The assigned value is preferably in the range of zero to the maximum capacity of the fuel tank.

The assigned value may be automatically set equal to the amount of fuel in one of the remaining fuel tanks having a functioning fuel quantity indicator. Alternatively, the assigned value may be manually entered and may be zero.

Alternatively, the decrease in gross weight of the aircraft may be deemed equal to the weight of fuel used.

Additionally or alternatively, the sequence of fuel transfers may continue until the trim tank is declared empty. The trim tank may be declared empty when a fuel pressure signal from a fuel pump located within the trim tank is below a threshold value for longer than a given period of time.

BRIEF DESCRIPTION OF THE DRAWINGS

Embodiments of the present invention will now be described below, by way of non-limiting example only, with reference to the accompanying figures, of which.

DESCRIPTION OF EMBODIMENTS OF THE INVENTION

Figure 1:
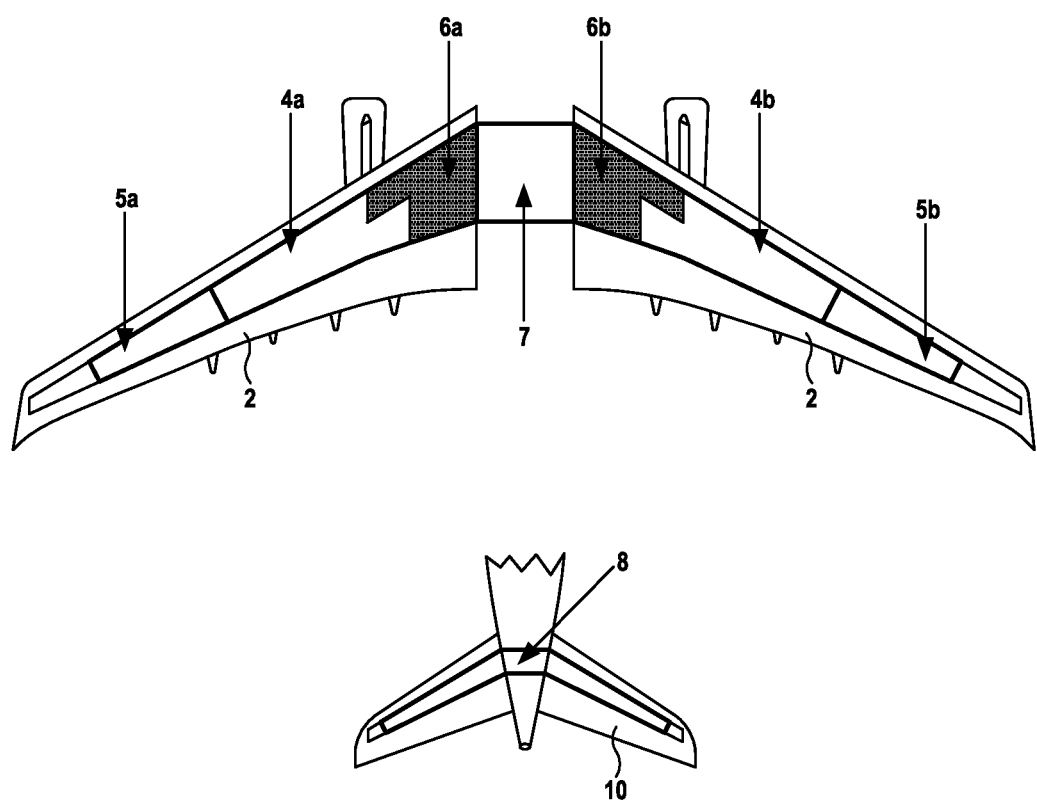
FIG. 1 schematically illustrates the possible fuel tank layout of an aircraft.

A typical arrangement of the individual fuel tanks within an aircraft fuel system is schematically illustrated in FIG. 1, with only those parts of the aircraft containing the fuel tanks, i.e. the wings and tail section, being illustrated for clarity. Located within the wings 2 of the aircraft are two pairs of fuel tanks (four individual tanks in total), an inner pair 4a, 4b and an outer pair 5a, 5b. Also located within the wings are two further tanks 6a, 6b from which the fuel actually fed to each engine is taken. These tanks are referred to as the feed tanks. Typically, the majority of the fuel carried by the aircraft is held within the wing tanks. A single central tank 7 is located within the fuselage of the aircraft between the wings. Additionally a single trim tank 8 is located in the tail section of the aircraft, and more particularly in the horizontal stabilisers 10. It will be appreciated that the illustrated fuel tank arrangement is shown purely as an example and other arrangements are possible. For example, some aircraft may have additional tanks located within the cargo bay of the aircraft.

Associated with each individual fuel tank is a corresponding fuel quantity indicator (FQI) that provides a reported value for the amount of fuel within each tank, this value generally being given in kilograms. In practice, readings from a number of individual fuel sensors will be taken for each fuel tank, together with information concerning the attitude of the aircraft and further information relating to the shape of the fuel tank, which when combined by an appropriate data processor provides a single value for the reported amount of fuel contained within the fuel tank. However, for the purposes of clarity and ease of understanding, the FQI for each fuel tank can be considered as a single unit. The values reported by each FQI for all of the individual fuel tanks are ordinarily reported to the flight crew by means of an appropriate display in the aircraft cockpit, as well as being provided to other parts of the aircraft control systems, including the fuel management system. As noted above, the gross weight centre of gravity (GWCG) of the aircraft may be calculated using the fuel mass values for each individual tank. The GWCG value is in turn used by the fuel management system to automatically transfer fuel between the individual fuel tanks to maintain the GWCG within the predetermined safety limits for the aircraft. However, in the event of a failure of an FQI it is no longer possible to directly calculate a value for GWCG in this manner.

According to an embodiment of the present invention in the event of a failure of one or more of the fuel tank FQIs a fuel transfer strategy is adopted that is based on the change of weight of fuel on the aircraft, and hence the change on overall weight of the aircraft, as the fuel is used. The strategy is to alternate fuel transfers to the feed tanks from one or more of the main fuel tanks, i.e. the wing or central fuel tanks, with fuel transfers to the feed tanks from the fuel tank having the greatest effect on the GWCG, each transfer having a duration equal to the time taken for the total weight of fuel on board the aircraft to decrease by a predetermined amount. According to one embodiment of the present invention fuel is transferred from the wing tanks for the length of time taken for the overall weight of fuel on board, and hence aircraft gross weight, to decrease by 30 tonnes and is then transferred from the trim tank for the time taken for the gross weight to decrease by 5 tonnes. The pattern then repeats. The fuel tank having the greatest effect on the GWCG of the aircraft will vary from aircraft to aircraft according to the arrangement of fuel tanks. For example, it may be the trim tank, located within the horizontal stabilisers, or may be a rear cargo tank.

Figure 2:
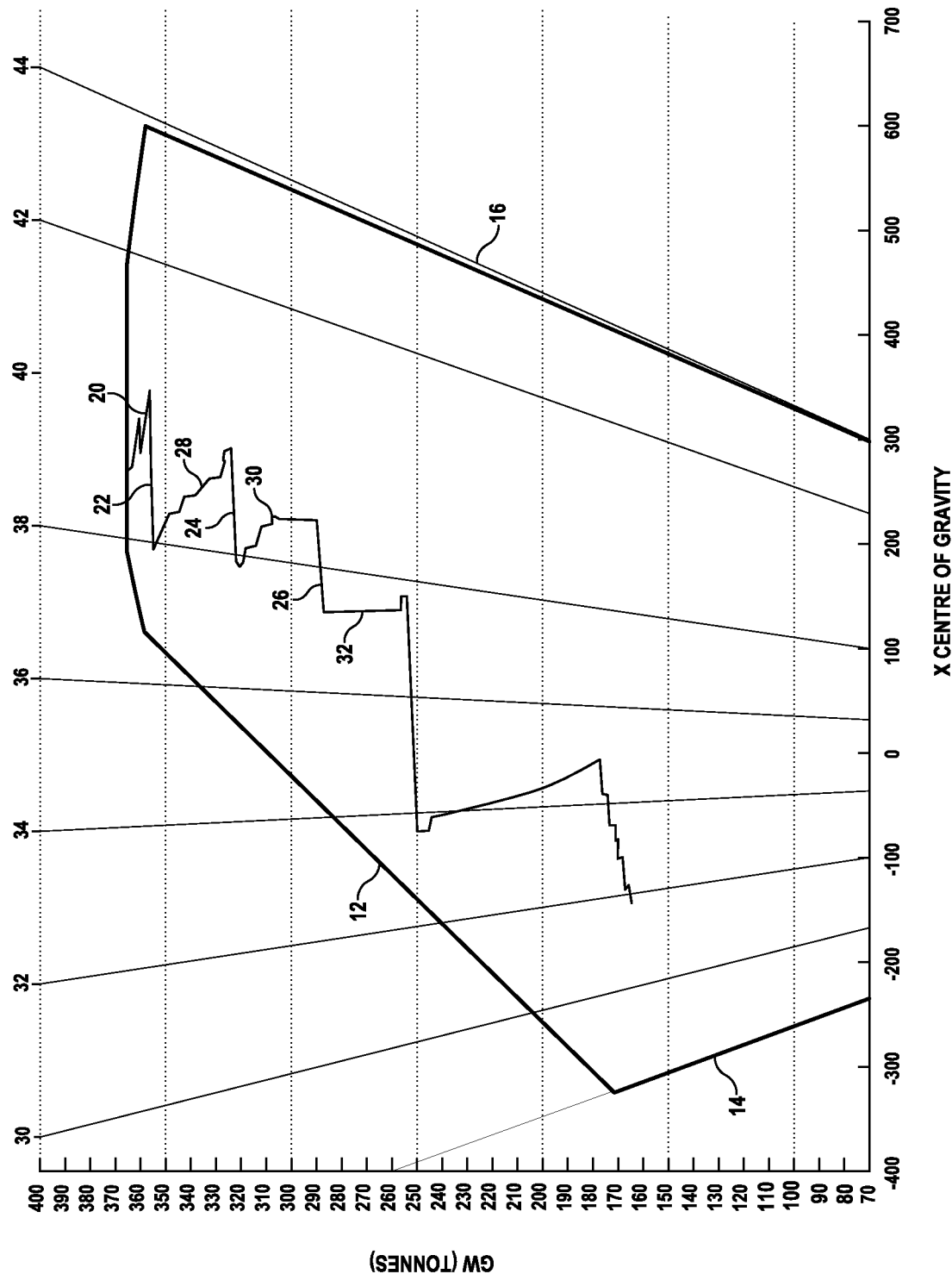
FIG. 2 illustrates the change in GWCG of an aircraft with fuel transfers operating in accordance with an embodiment of the present invention.

The pattern of the fuel transfers and their durations is predetermined to ensure that the GWCG of the aircraft remains within the set fore and aft limits for that aircraft, based on the assumption that the GWCG is initially well within the fore and aft limits at the time of the FQI failure. This assumption is valid because under normal operation of fuel transfers the GWCG is controlled so as to be within the fore and aft limits by the required margins. FIG. 2 graphically illustrates the variation of the actual GWCG of an aircraft when fuel transfers are being operated in accordance with the embodiment of the present invention referred to above. The vertical axis represents the gross weight of the aircraft (in this particular case a large passenger aircraft), whilst both the upper and lower horizontal axes represent the centre of gravity of the aircraft, measured in units of the percentage of the Mean Aerodynamic Chord (MAC) from the MAC leading edge and tonnes/meter respectively. The thicker solid line represents the predetermined limits of the GWCG for the aircraft for the various possible aircraft gross weights within which it is mandated that the GWCG remains to ensure the aircraft can be controlled safely. These limits are typically numerically modelled for new designs of aircraft and verified by actual test flight data and will therefore vary from one design of aircraft to another. The fore GWCG limit is represented by the left hand elements of the solid line indicated by arrows 12 and 14, whilst the aft limit is indicated by arrow 16. The thinner line 18 plotted between the fore and aft GWCG limits represents the actual GWCG of the aircraft over time as fuel is used and hence as the gross weight of the aircraft decreases with fuel transfers being performed in accordance with the embodiment of the invention. The top end of the plotted line represents the point in time when an FQI failure is reported, which in the illustrated example corresponds to an aircraft gross weight of approximately 370 tonnes. According to the embodiment of the invention discussed above a fuel transfer from the wing tanks begins and continues until the gross weight of the aircraft has decreased (through fuel use) by 30 tonnes. This is illustrated on FIG. 2 by arrow 20. At this point the transfer from the wing tanks is stopped and a transfer from the trim tank begins and continues until the gross weight of the aircraft has decreased by a further 5 tonnes, as illustrated by arrow 22. This pattern is then repeated. It can be seen from FIG. 2 that the fuel transfers from the trim tank (marked by arrows 22, 24 & 26) have a far greater effect on the aircraft GWCG than the transfers from the wing tanks (marked by arrows 20, 28, 30 & 32).

The pattern of transfers is stopped when either the aircraft begins it's descent in advance of landing or the trim tank is declared empty. The trim tank may be declared empty either on the basis of the reported value from it's FQI or, if the trim tank FQI has failed, when one or more of the fuel pumps located within the trim tank report a low fuel pressure reading for longer than a predetermined period of time, indicating that there is insufficient fuel remaining in the trim tank for normal pump operation.

A number of methods may be used in accordance with embodiments of the present invention to determine the change in gross weight of the aircraft in the event of an FQI failure. One such method is to calculate a value for the aircraft gross weight, AGW_Failed_FQI, using the method provided in the applicant's co-pending patent application (applicant ref. XA2939). This method calculates AGW_Failed_FQI as:

$$AGW\_FailedFQI = FOB\_FailedFQI + ZFW$$

where ZFW is a predetermined value for the weight of the aircraft with zero fuel on board (typically manually entered into the fuel management system by the aircraft crew) and FOB_Failed_FQI is a calculated value for the amount of fuel on board the aircraft. The calculation of FOB_Failed_FQI is performed as follows:

$$FOB\_FailedFQI = FOBinit - Fuel\_Used$$

Fuel_Used is the value of fuel used by the aircraft's engines from the point at which all the aircraft's engines were started and fully running and is determined from the sum of the values provided by fuel used indicators associated with each aircraft engine.

FOBinit is a value for the initial amount of fuel on board at the point at which all the aircraft's engines are fully running prior to dispatch of the aircraft, i.e. the same point in time from which Fuel_Used is recorded. If all of the FQIs for the aircraft are functioning at the point of dispatch of the aircraft then the value of FOBinit is given as the sum of the fuel quantity values reported by each FQI. A value for FOB_Failed_FQI is then continuously calculated by the fuel management system during the aircraft flight in case of a subsequent FQI failure, in which case the calculated value for FOB_Failed_FQI replaces the normal value of FOB.

If an FQI failure occurs before the aircraft is dispatched then a value for FOBinit is determined in an alternative way. According to some embodiments the value for FOBinit is determined as the sum of values reported by the working FQIs plus an assigned value for the amount of fuel in the fuel tank associated with the failed FQI. The assigned value may simply be a value manually entered by the aircraft crew based on their knowledge of the expected quantity of fuel in the failed FQI tank. Alternatively, the assigned value may be automatically determined depending on the location of the fuel tank associated with the failed FQI. For example, if the fuel tank associated with the failed FQI is one of the wing tanks (4a, 5a) then the assigned value is set to be equal to the reported FQI value for the corresponding sister tank (4b, 5b) located in the opposite wing. If the fuel tank associated with the failed FQI is the trim tank then the assigned value is set to zero. Where more than one FQI failure occurs then an assigned value for each of the associated tanks is determined according to any of the above described methods e.g. more than one method of determining respective assigned value can be done simultaneously.

A further alternative method of determining a value for FOBinit is to manually enter an estimated value for each fuel tank (irrespective of whether their associated FQI has failed or not) and sum all the estimated values.

Using the above methods to calculate a value for AGW_Failed_FQI in the event of an FQI failure, the change in AGW_Failed_FQI can be determined and used to control the fuel transfer pattern according to embodiment of the present invention.

In other embodiments the value for FOB_Failed_FQI may alternatively be used to determine the change in gross weight of the aircraft and thus control the fuel transfer pattern.

In further embodiments the value of fuel used, as determined by summing the reported values of fuel used by each engine from the associated fuel used indicators, may be used to directly determine the change in gross weight of the aircraft and thus control the fuel transfer regime.

As noted and as will be appreciated, the duration of each fuel transfer will be different for different designs of aircraft. However, the in all cases the transfer duration will be determined based on the known GWCG characteristics (as per the example shown in FIG. 2) to ensure that the fuel transfers maintain the GWCG within the set fore and aft limits for that aircraft.

The invention claimed is:

1. A method of controlling the centre of gravity of an aircraft having a plurality of fuel tanks, the method comprising calculating, upon detection of the failure of one or more fuel quantity indicators (FQI) associated with respective fuel tanks, a decrease in gross weight of the aircraft based on an amount of fuel used during flight, and transferring fuel from one or more of the fuel tanks according to a predetermined sequence, the timing of the sequence being dependent on the calculated decrease in gross weight of the aircraft.

2. The method of claim 1, wherein the predetermined sequence is arranged to maintain the centre of gravity of the aircraft between predetermined fore and aft limits.

3. The method of claim 1, wherein the plurality of fuel tanks includes a trim tank and the sequence comprises alternating between a fuel transfer from one or more of the fuel tanks other than the trim tank for the time taken for the gross weight to decrease by a first amount and a fuel transfer from the trim tank for the time taken for the gross weight to decrease by a second amount, the second amount being less than the first amount.

4. The method of claim 3, wherein the sequence of fuel transfers continues until the trim tank is declared empty.

5. The method of claim 4, wherein the trim tank is declared empty when a fuel pressure signal from a fuel pump located within the trim tank is below a threshold value for longer than a given period of time.

6. The method of claim 1, wherein the gross weight of the aircraft is calculated as the sum of a predetermined value for the weight of the aircraft with zero fuel on board and a value for the current fuel on board.

7. The method of claim 6, wherein the value for the current fuel on board is calculated as a value for the initial amount of fuel on board (FOBinit) minus the amount of fuel used.

8. The method of claim 7, wherein the value for the initial amount of fuel on board (FOBinit) is determined at the time when all the aircraft engines have started as the sum of fuel in each fuel tank.

9. The method of claim 8, wherein the amount of fuel in each fuel tank is manually entered.

10. The method of claim 7, wherein each fuel tank has an associated fuel quantity indicator and the value for the initial amount of fuel on board (FOBinit) is determined at the time when all the aircraft engines have started as the sum of an assigned value of fuel for each fuel tank having a failed associated fuel quantity indicator plus the sum of fuel in each of the remaining fuel tanks.

11. The method of claim 10, wherein the assigned value is in the range of zero to the maximum capacity of the fuel tank.

12. The method of claim 11, wherein the assigned value is manually entered.

13. The method of claim 12, wherein the manually entered value is zero.

14. The method of claim 1, wherein the decrease in gross weight of the aircraft is deemed equal to the weight of fuel used.

15. A method of controlling the centre of gravity of an aircraft having a plurality of fuel tanks, the method comprising transferring fuel from one or more of the fuel tanks according to a predetermined sequence, the timing of the sequence being dependent on the decrease in gross weight of the aircraft, wherein the gross weight of the aircraft is calculated as the sum of a predetermined value for the weight of the aircraft with zero fuel on board and a value for the current fuel on board, wherein the value for the current fuel on board is calculated as a value for the initial amount of fuel on board (FOBinit) minus the amount of fuel used, wherein each fuel tank has an associated fuel quantity indicator and the value for the initial amount of fuel on board (FOBinit) is determined at the time when all the aircraft engines have started as the sum of an assigned value of fuel for each fuel tank having a failed associated fuel quantity indicator plus the sum of fuel in each of the remaining fuel tanks, wherein the assigned value is in the range of zero to the maximum capacity of the fuel tank, and, wherein the assigned value is automatically set equal to the amount of fuel in one of the remaining fuel tanks having a functioning fuel quantity indicator.

* * * * *